US009252631B2

(12) United States Patent
Latham

(10) Patent No.: US 9,252,631 B2
(45) Date of Patent: Feb. 2, 2016

(54) DATA CENTER BATTERY ENHANCEMENT METHOD AND SYSTEM

(76) Inventor: Andrew V. Latham, Ridgefield, NJ (US)

( * ) Notice: Subject to any disclaimer, the term of this patent is extended or adjusted under 35 U.S.C. 154(b) by 830 days.

(21) Appl. No.: 13/491,657

(22) Filed: Jun. 8, 2012

(65) Prior Publication Data

US 2012/0313437 A1 Dec. 13, 2012

Related U.S. Application Data

(60) Provisional application No. 61/494,573, filed on Jun. 8, 2011.

(51) Int. Cl.
| | |
|---|---|
| *H02J 7/00* | (2006.01) |
| *H02J 9/00* | (2006.01) |
| *H02J 9/06* | (2006.01) |
| *H02J 1/10* | (2006.01) |
| *H02J 7/08* | (2006.01) |

(52) U.S. Cl.
CPC . *H02J 9/06* (2013.01); *H02J 1/102* (2013.01); *H02J 7/0018* (2013.01); *H02J 7/0063* (2013.01); *H02J 7/085* (2013.01); *H02J 9/061* (2013.01); *H02J 2007/0067* (2013.01); *Y10T 307/62* (2015.04)

(58) Field of Classification Search
CPC ........ H02J 9/062; H02J 9/06; Y10T 307/615; Y10T 307/625
USPC ............... 307/64–66; 320/122, 132, 134, 136
See application file for complete search history.

(56) References Cited

U.S. PATENT DOCUMENTS

| | | | | | |
|---|---|---|---|---|---|
| 5,422,558 | A | * | 6/1995 | Stewart | 320/120 |
| 5,982,652 | A | * | 11/1999 | Simonelli et al. | 363/142 |
| 6,133,709 | A | * | 10/2000 | Puchianu | 320/116 |
| 6,137,292 | A | * | 10/2000 | Hirsch et al. | 324/427 |
| 6,268,711 | B1 | * | 7/2001 | Bearfield | 320/117 |
| 6,300,763 | B1 | * | 10/2001 | Kwok | 324/427 |
| 7,141,894 | B2 | * | 11/2006 | Kraus | 307/65 |
| 8,608,521 | B1 | * | 12/2013 | Snyder et al. | 440/1 |
| 8,742,762 | B2 | * | 6/2014 | Henkel et al. | 324/426 |
| 8,866,441 | B2 | * | 10/2014 | Weng et al. | 320/122 |
| 2003/0236656 | A1 | * | 12/2003 | Dougherty | 703/14 |
| 2005/0121979 | A1 | * | 6/2005 | Matsumoto et al. | 307/66 |
| 2005/0141154 | A1 | * | 6/2005 | Consadori et al. | 361/62 |
| 2005/0184593 | A1 | * | 8/2005 | Gottlieb et al. | 307/66 |
| 2005/0288878 | A1 | * | 12/2005 | Ng | 702/63 |
| 2007/0055409 | A1 | * | 3/2007 | Rasmussen et al. | 700/286 |
| 2009/0015203 | A1 | * | 1/2009 | Oakes | 320/132 |
| 2009/0086520 | A1 | * | 4/2009 | Nishimura | 363/133 |

(Continued)

*Primary Examiner* — Carlos Amaya
(74) *Attorney, Agent, or Firm* — Lowenstein Sandler LLP; Raymond G. Cappo

(57) ABSTRACT

A method for increasing workable power output and run time duration of a battery backup system is disclosed. A plurality of battery groups is provided. A microprocessor electrically connects the power output of a first battery group and a second battery group to a UPS. The microprocessor monitors the output voltage of the first and second battery groups. When the monitored output voltage of the first and second battery group falls below a predetermined level, the microprocessor electrically disconnects from the UPS the first battery group and electrically connects to the UPS the power output of another of the plurality of battery groups. The first battery group is configured to be re-connectable to the UPS after a time period equal to or greater than necessary to permit the output voltage of the first battery group to recover to about its nominal voltage rating.

22 Claims, 6 Drawing Sheets

(56) References Cited

U.S. PATENT DOCUMENTS

| | | | |
|---|---|---|---|
| 2009/0167243 A1* | 7/2009 | Xiao et al. | 320/122 |
| 2010/0079146 A1* | 4/2010 | Kurose et al. | 324/433 |
| 2010/0244575 A1* | 9/2010 | Coccia et al. | 307/82 |
| 2010/0259221 A1* | 10/2010 | Tabatowski-Bush | 320/134 |
| 2010/0261048 A1* | 10/2010 | Kim et al. | 429/150 |
| 2011/0133556 A1* | 6/2011 | Choi | 307/65 |
| 2011/0140649 A1* | 6/2011 | Choi | 320/101 |
| 2011/0144822 A1* | 6/2011 | Choi | 700/297 |
| 2011/0210746 A1* | 9/2011 | Yugou et al. | 324/427 |
| 2011/0234164 A1* | 9/2011 | Furukawa | 320/118 |
| 2012/0086390 A1* | 4/2012 | Lim et al. | 320/107 |

\* cited by examiner

DATA CENTER BATTERY ENHANCEMENT METHOD AND SYSTEM

CROSS-REFERENCE TO RELATED APPLICATION

This application claims the benefit of U.S. provisional patent application No. 61/494,573 filed Jun. 8, 2011, the disclosure of which is incorporated herein by reference in its entirety.

FIELD OF THE INVENTION

The invention relates generally to power systems. More specifically, the invention relates to a method and system for extending run time of existing battery backup systems or reducing the quantity of batteries needed for a set amount of run time of battery backup systems.

BACKGROUND OF THE INVENTION

Operating data centers is expensive with respect to floor space, cooling, energy demand needs, etc. Battery systems and battery storage cabinets employed in data centers are also expensive, are heavy, and have maintenance needs proportional to their physical size, energy storage, and production.

Data centers employ battery-powered backup systems known as un-interruptable power supplies (UPS). These systems may be integrated into a main electrical power source and automatically become operational when a power outage or power instability occurs. The UPS may supply the necessary power to keep the data center running until a standby generator starts or may permit an orderly shutdown of servers. It is not uncommon for a data center that experiences a complete power outage (i.e., a crash) and loses of all of its servers (without an orderly shutdown) to incur substantial monetary losses before re-starting.

UPS's that employ battery systems are supplied in large enclosed steel cabinets (and sometimes exposed racks). When fully populated with batteries, these cabinets can weigh four to five thousand pounds or more. Conventional cabinets may be the size of an old fashion pay telephone booth (e.g., about 7 and ½ feet high) and typically reside in the data center rooms. Typically these cabinets operate at about 480 volts DC and provide up to about 150 amp-hours (ah) of energy. For example, if a UPS is configured to consume full energy in 15 minute, the effective consumption rate is about 600 ah. When operated at four times rated consumption, these batteries are highly stressed in terms of a rapid rate of chemical reaction and production of heat.

FIG. 1 depicts an electrical block diagram of a conventional UPS system employing 3 battery backup sources. Some data centers use very large batteries (e.g., 300 to 650 lbs each) that are wired in series in battery groups $4a$-$4n$ known as strings and the resulting strings are additionally wired in parallel and coupled to a UPS bus bar 6 as indicated in FIG. 1 to provide for long run times (as current may flow out of the battery groups $4a$-$4n$ during discharge and into the groups $4a$-$4n$ during re-charge by the UPS as indicated by the arrows 8). The conventionally wired system 2 may be so large as to fill multiple rooms at considerable cost.

Conventional UPS systems employ a rated system voltage of 360 vdc to 480 vdc with some systems having rated voltages between these two values. Rated output voltages are derived from multiples of a fundamental unit cell voltage of 2 volts, 4 volts, 6 volts, 8 volts, 12 volts or 16 volts (e.g., 40, 12 volt batteries wired in series to produce 480 vdc). Since most data centers need large amounts of power, several strings may be wired in parallel to provide a constant 480 voltage at significantly higher current. For example, a small to medium size data center may have six battery cabinets at 480 vdc with 150 ah of capacity configured to be drawn down at the time rate of 15 minutes. Each cabinet may have 600 amps of deliverable power (over 15 minutes) times six, or 3600 amps of power times 480 vdc for a total output of 1.7 megawatts (mw) of power. Certain conventional large data centers may have battery backup power supplies of as much as 25 megawatts.

Unfortunately, each megawatt-hour of battery power may cost up to 125 thousand dollars or more and weigh as much as 30 thousand pounds, take up considerable space, and use significant power to recharge. As a rule, the bigger the data center system and/or the bigger the battery back up system, the more cost and energy demand expense and footprint size. Often these systems may be placed in a very expensive building that may be located in very expensive areas (e.g., Manhattan).

Another shortcoming relates to battery chemistry. Puekert's law expresses a measure of battery chemistry inefficiency at full power demand with respect to a battery's electrolyte-cell plate junction. At this junction, chemicals may be consumed at such a high rate that they cannot be replenished rapidly enough. As a result, energy output degrades and battery power (voltage) drops off quickly. A conventional fully charged battery cell has an output voltage per cell of 2.35 vdc. These cells may be arranged in series (e.g., 6 cells) to provide about times 14.1 volts for a 12 volt rated battery.

A fully charged 2.35 volt cell in a 12 volt battery (six cells) will safely provide current until the individual cell drops to 1.65 vdc or down to a total of 9.9 volts output per fully-configured battery, at which the battery is considered to be dead or out of power. In such circumstances, a battery cabinet or the end of each battery string is provided with a circuit breaker with a low voltage trip solenoid. When the string voltage drops under a certain value, the circuit breaker disconnects the batteries from the load and the power is cut off. A fully charged 480 volt (DC) rated battery cabinet/string having an operating initial voltage of 564 vdc is considered dead and will trip a low-voltage circuit breaker at about 396 vdc. Low-voltage circuit breaking is provided for a number of reasons: (1) the batteries do not have sufficient power and thus the UPS cannot produce sufficient power to run a data center; (2) a battery may be permanently damaged if its voltage drop is too low and may never be fully rechargeable; (3) thermal runaway may result; and (4) cell polarity reversal can occur with serious consequences.

Thermal runaway occurs when battery chemistry reacts at such a rapid pace that the battery heats to its melting point (with often dangerous out-gassing). At this point, even with the energy load disconnected, the battery is sufficiently damaged and the reaction will continue, causing more heat, up to and including the battery's self-ignition point where fire or a violent explosion may occur. As a result, there are some significant obstacles to power supply design.

Returning to Peukert's Law (i.e., Peukert's Equation; see below), several chemistry related problems may result when attempting to discharge a battery at a higher discharge rate than specified. In fact, by slightly discharging a battery above or near its rated discharge rate (e.g., a 150 ah battery may be rated to be discharged for about one hour for up to 15 minutes), chemical reactions may occur at a rate that passes a limit and the batteries' total capacity may be degraded by a factor of 1.3 to 1.4. This chemical limitation is related to "interface charge," and from Peukert's Law, when a battery is charged or discharged, this action initially affects only the reacting chemicals which are at the interface (direct contact) between the electrodes and the electrolyte. With time, these chemicals at the interface, which may be called an interface charge, spread by diffusion throughout the volume of active material.

Peukert's Equation is a convenient way of characterizing cell behavior and of quantifying capacity offset in mathematical terms. Peukert's Equation is an empirical formula which approximates how the available capacity of a battery changes according to its rate of discharge. According to Peukert's Equation: $C=I^n T$, where "C" is the theoretical capacity of the battery expressed in amp-hours, "I" is the current, "T" is time, and "n" is the Peukert Number, a constant for the given battery. The equation shows that at higher currents, there is less available energy in a battery. The Peukert Number is directly related to the internal resistance of a battery. Higher currents translate to more losses and less available capacity.

The Peukert Number indicates how well a battery performs under continuous heavy currents. A value close to one indicates that the battery performs well; the higher the number, the more capacity is lost when the battery is discharged at high currents. The Peukert number of a battery is determined empirically. For Lead acid batteries, the number is typically between 1.3 and 1.4.

SUMMARY OF THE INVENTION

The above-described problems are addressed and a technical solution is achieved in the art by providing a system and method for increasing workable power output of a battery backup system. A plurality of battery groups each having a nominal voltage rating is provided. The power output of each battery group is wired for electrical connection to an uninterruptible power supply (UPS) through a microprocessor-controlled power switch. The voltage level of the power output of each battery group is monitored by a microprocessor through a voltage sensing circuit.

During a power outage, when the UPS employs the battery back up system, the microprocessor may disconnect one of the plurality of battery groups with at least two battery groups in operation simultaneously. The microprocessor monitors the output voltage of the first and a second battery group. When the monitored output voltage of the first and the second battery group falls below a predetermined level, the microprocessor electrically connects a third battery group (i.e., another battery group) and then disconnects from the UPS the first battery group. The first battery group is configured to be re-connectable to the UPS after a time period equal to or greater than necessary to permit the output voltage of the first battery group to recover to about its nominal voltage rating.

In an embodiment, the another battery group may be the one that first recovers to its nominal voltage rating or has spent a longest amount of time in a recovered state with respect to nominal voltage rating. In an embodiment, the another battery group may be the one that first recovers to ambient temperature or has spent a longest amount of time in a recovered state with respect to ambient temperature. In an embodiment, the another battery group may be the one that first recovers to it nominal pH rating or has spent a longest amount of time in a recovered state with respect to nominal pH rating.

In another embodiment, the another of the plurality of battery groups may be randomly or sequentially selected from the remaining plurality of battery groups.

In another embodiment of a system and method for increasing workable power output of a battery backup system, a plurality of battery groups each having a common nominal voltage rating is provided. The power output of each battery group is wired to an associated voltage regulator of a plurality of microprocessor-controlled voltage regulators. The voltage level of the power output of each battery group is monitored by the microprocessor through a voltage sensing circuit. Each of the voltage regulators is wired in series to provide a combination voltage to an uninterruptible power supply (UPS). An output voltage of a first voltage regulator associated with a first battery group is set by microprocessor control to a first voltage level that is larger than one or more voltage levels set by microprocessor control and associated with corresponding ones of the remaining plurality of voltage regulators.

The microprocessor monitors the output voltage of the first battery group. When the monitored output voltage of the first battery group falls below a predetermined level. The microprocessor decreases the output voltage level of the first voltage regulator to the one or more voltage levels and increases the output voltage level of another of the voltage regulators to the first voltage level to maintain the combination voltage. The output voltage of the voltage regulator associated with the first battery group is configured to be increased to the first voltage level after a time period equal to or greater than necessary to permit the output voltage of the first battery group to recover to about its nominal voltage rating.

In an embodiment, the another battery group may be the one that first recovers to its nominal voltage rating or has spent a longest amount of time in a recovered state with respect to nominal voltage rating. In an embodiment, the another battery group may be the one that first recovers to ambient temperature or has spent a longest amount of time in a recovered state with respect to ambient temperature. In an embodiment, the another battery group may be the one that first recovers to it nominal pH rating or has spent a longest amount of time in a recovered state with respect to nominal pH rating.

In another embodiment, the another of the plurality of battery groups may be randomly or sequentially selected from the remaining plurality of battery groups.

In an embodiment, the rate of decreasing the output voltage of the first voltage regulator may be about the rate of increasing the output voltage of the another voltage regulator such that the combination voltage remains substantially constant.

In one embodiment, each of the plurality of voltage regulators may be a variable voltage regulator.

BRIEF DESCRIPTION OF THE DRAWINGS

The present invention will be more readily understood from the detailed description of exemplary embodiments presented below considered in conjunction with the attached drawings in which like reference numerals refer to similar elements and in which.

It is to be understood that the attached drawings are for purposes of illustrating the concepts of the invention and may not be to scale.

DETAILED DESCRIPTION OF THE INVENTION

A consequence of Peukert's Law is that when a battery is discharged at its rated discharge rate, significantly more power may be made available over time. The battery may be discharged at a lowest rate possible, which is slightly above the battery's "self-discharge" rate.

Figure 1:
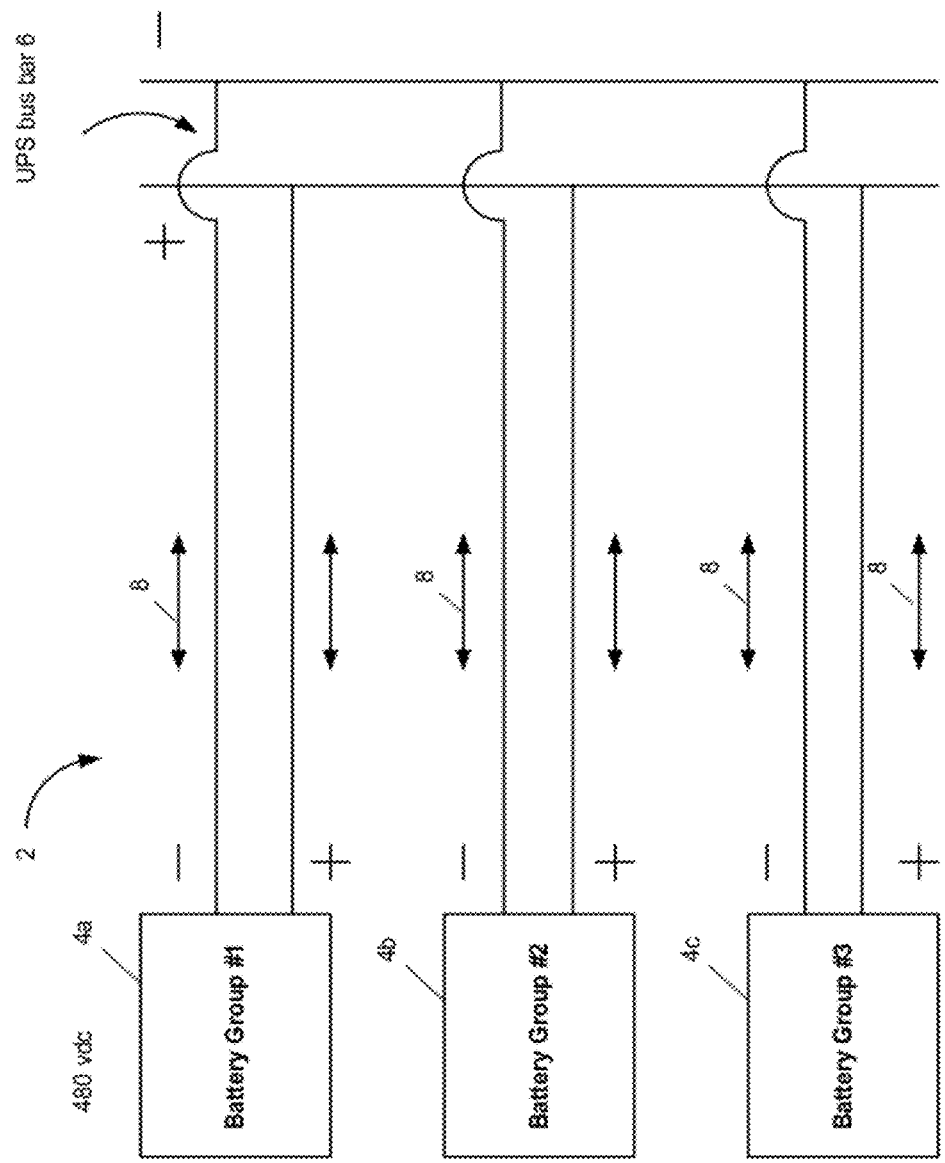
FIG. 1 depicts an electrical block diagram of a conventional UPS system employing battery backup sources.
Figure 2:
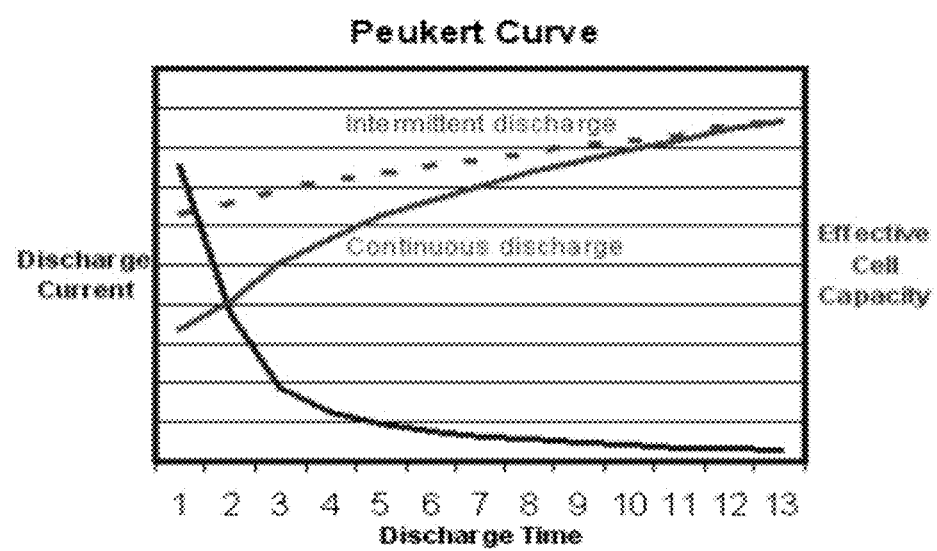
FIG. 2 is a graph illustrating Peukert's curve in terms of effective cell capacity as measured by discharge current over discharge time.

FIG. 2 is a graph illustrating Peukert's curve in terms of effective cell capacity as measured by discharge current over discharge time. FIG. 2 illustrates that effective battery capacity is radically reduced at very high continuous discharge rates. However, with intermittent use, a battery may have time to recover during quiescent periods when its chemistry at the electrolyte cell interface has recovered due to diffusion and its temperature returns to an ambient level. Because of this potential for recovery, UPS run time capacity may be improved and operating efficiency may be increased (or fewer batteries may be needed or the same number of battery groups may be employed but with a smaller amp hour capacity) if a battery is operated intermittently as shown by the dotted line 10 in FIG. 2.

For example, a 100 Ah battery may deliver a steady 5 amps for 20 hours before its battery voltage drops to 1.75 volts per cell. However, if discharged at a current of 100 amps, the 100 Ah battery delivers approximately 47 total amp hours. This effect is known as the Peukert Effect (as exhibited by Peukert's Equation).

When the 100 Ah battery output voltage drops below 9.9 vdc, and it is configured with a low voltage trip circuit breaker, the circuit breaker disconnects the 100 Ah battery from a load. Fortunately, seconds after the low voltage trip, if the 100 Ah battery cell voltage were monitored, the battery cell voltage may begin to rise and settle at about full rated voltage potential per cell. As a side effect of Puekert's Law, battery electrolyte and chemistry have recovered because fresh electrolyte migrates to the cell interface, and almost full power is once again available.

According to an embodiment, battery groups may be rewired through an intermediate device(s) that permits the battery groups or strings to be placed into and out of a load cycle through a device that interfaces with a UPS (which is part charger and part inverter) located between the battery groups and the UPS. The intermediate device may include switches, variable voltage regulators, a microprocessor, and switching logic for sequencing in and out battery groups, single or mixed strings, or the variable voltage regulators to permit sufficient time for the battery groups or strings to recover their full interface cell chemistry potential according to Puekert's equation.

By monitoring power readings per group, per string, or per string groups, individual groups of batteries may recover and regain full potential. This may result in a 40% to 80% improvement in run time capacity with the same number of batteries. Battery life would also be improved since the batteries are not operated close to their depth of discharge limit.

Figure 3:
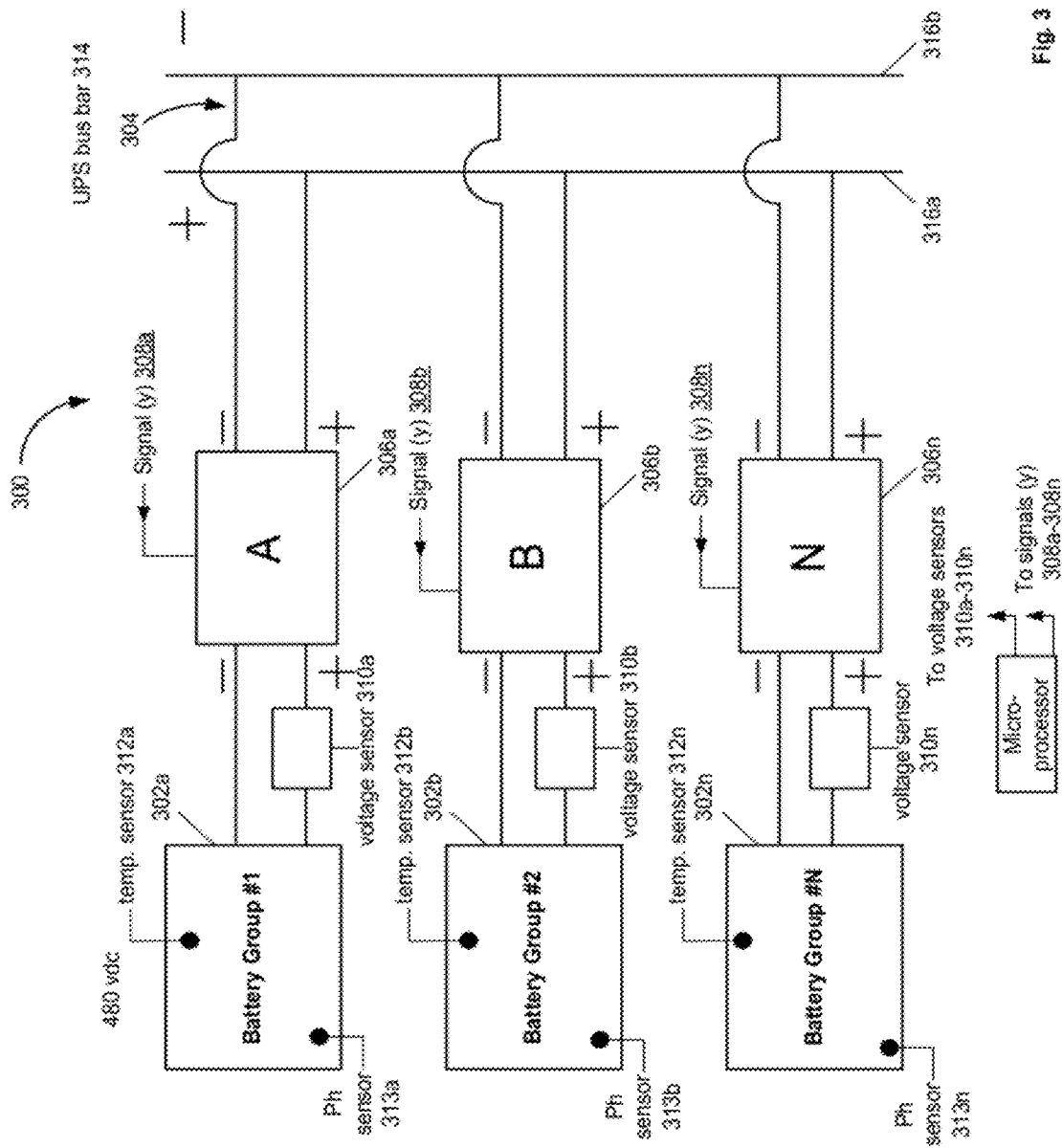
FIG. 3 is an electrical block diagram of a battery backup power system employing battery cabinets of battery groups or battery strings configured to be coupled in parallel to an uninterruptible power supply (UPS), according to an embodiment of the present invention.
Figure 5:
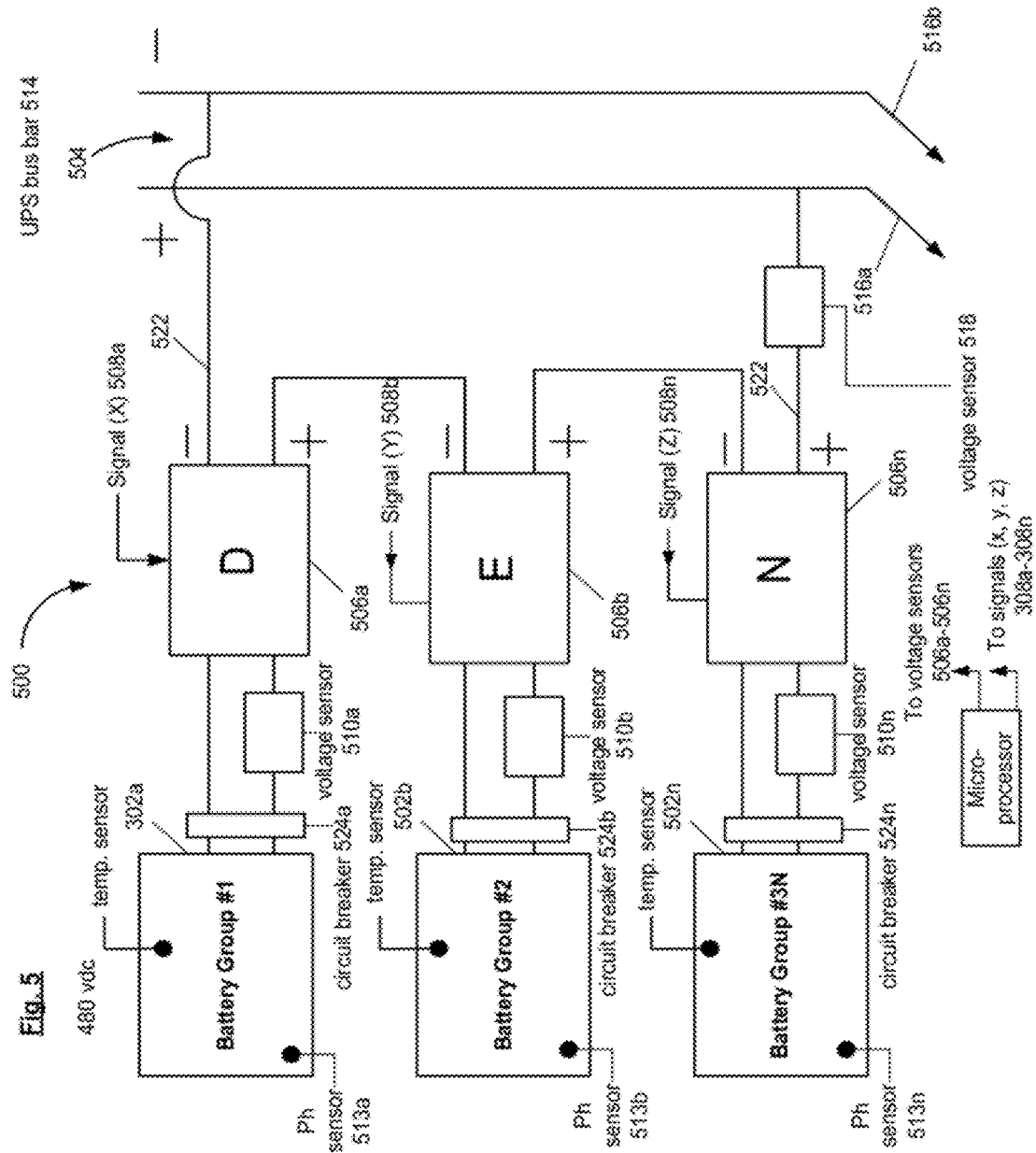
FIG. 5 is an electrical block diagram of a battery backup power system employing battery cabinets of battery groups or battery strings connected to variable voltage regulators coupled in series to an uninterruptible power supply (UPS), according to an embodiment of the present invention.

Individual battery voltage may be measured; string voltage may be measured; amperage draw over time may be measured; and battery temperature rise or change in battery electrolyte ph may be measured, or any combination thereof to determine when a single or multiple strings of batteries are approaching the Puekert number and to determine when to sequence out one string and sequence in another. In an embodiment, battery groups (or racks) may be wired in parallel as illustrated in FIG. 3 and disconnects or switches may be employed to sequence in and out groups or strings or string groups while maintaining a rated 360 vdc to 480 vdc to the power supply. Alternatively, as illustrated in FIG. 5, battery groups (or racks) may be wired to a plurality of variable voltage regulators/controllers coupled to each other in series to maintain a total output voltage at 360 vdc to 480 vdc while sequence in and out battery groups or strings or string groups individually.

FIG. 3 is an electrical block diagram of a battery backup power system 300 employing parallel wired battery groups or battery strings $302a$-$302n$, according to an embodiment of the present invention. In the embodiment depicted in FIG. 3, one or more battery strings may be wired in parallel and configured as multiple parallel (e.g. three) battery groups $302a$-$302n$ of power sources. Each of the battery groups $302a$-$302n$ may be comprised of any type of batteries or battery-like devices that operate though electrochemical means (e.g., lead-acid, lead-air, lithium-ion, a fuel cell, etc.). A UPS 304 may be coupled to a fixed number of groups of batteries, e.g., one battery group $302a$ through the operation of intervening power switches $306a$-$306n$ (e.g., A, B, . . . , N). A microprocessor 320 may be configured to operate the power switches $306a$-$306n$ by means of output signal lines $308a$-$308n$ (y). The microprocessor 320 may be further configured to monitor output voltage via voltage sensors $310a$-$310n$ in signal communication with the battery groups $302a$-$302n$ and monitor battery temperatures via temperature sensors $312a$-$312n$ in thermal communication with the battery groups $302a$-$302n$. The microprocessor 320 may be further configured to monitor battery pH via pH sensors $313a$-$313n$ in signal communication with the battery groups $302a$-$302n$. The UPS bus bar 314 may be equipped with blocking diodes $316a$, $316b$ to permit recharging of the battery groups $302a$-$302n$. The microprocessor 320 may be configured to remember the last two battery groups $302a$-$302n$ in use and may be configured to switch in a battery group that has had the most time to recover battery chemistry so as to maintain equal consumption of energy and to balance the life of the individual power sources. This equal consumption can be obtained from various measurements and calculations and employed to balance "wear" as illustrated in FIG. 4 and in the example that follows.

Figure 4:
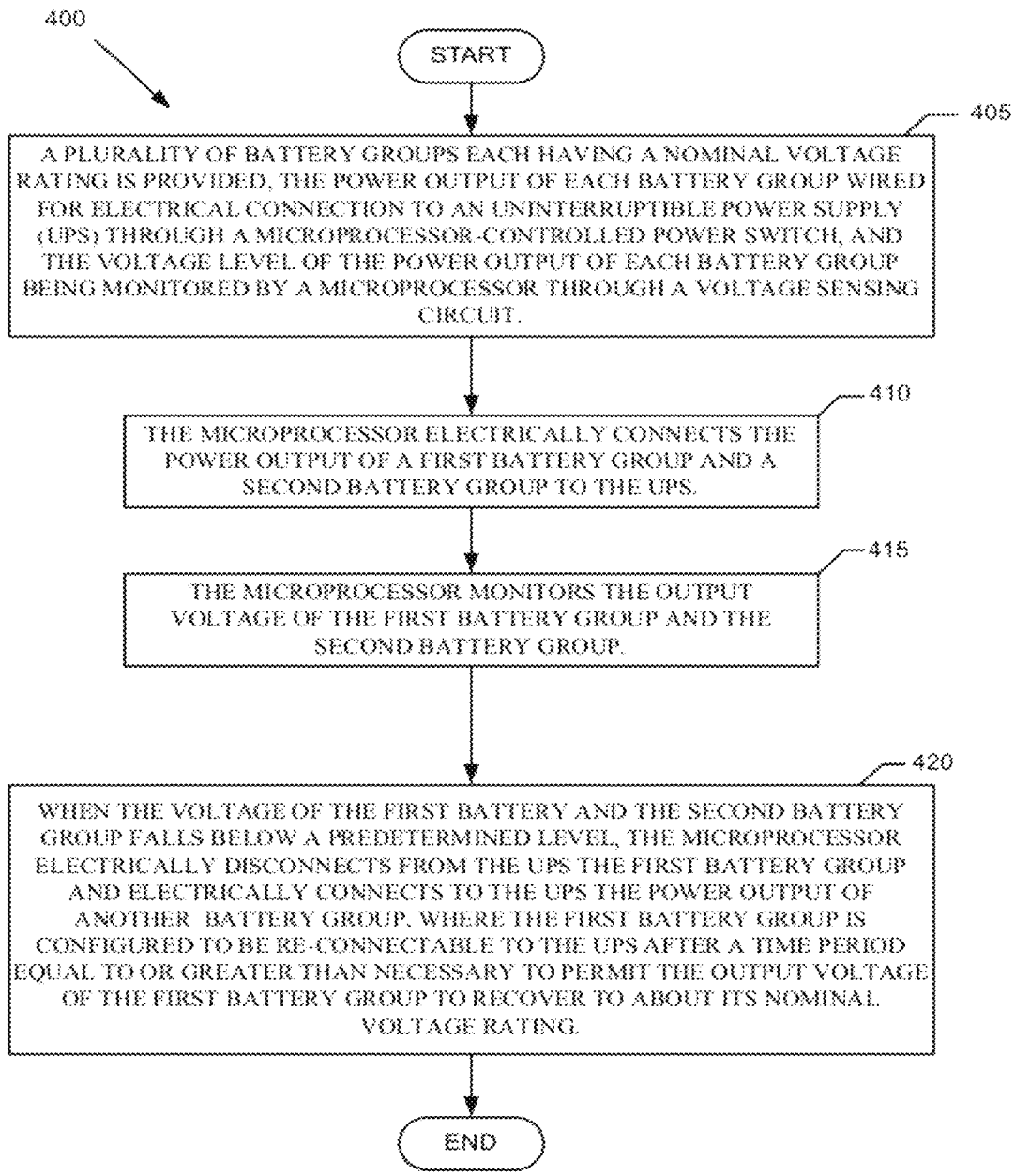
FIG. 4 is a flow diagram illustrating one embodiment of a method for increasing workable power output of the battery backup system of FIG. 3.

FIG. 4 is a flow diagram illustrating one embodiment of a method 400 for increasing workable power output of the battery backup system 300 of FIG. 3. At block 405, a plurality of battery groups $302a$-$302n$ each having a nominal voltage rating (e.g., 480 vdc) is provided. The power output of each of the battery groups $302a$-$302n$ is wired for electrical connection to the uninterruptible power supply (UPS) 304 through a microprocessor-controlled power switch $306a$-$306n$. The voltage level of the power output of each battery group $302a$-$302n$ is monitored by a microprocessor 320 through an associated voltage sensing circuit $310a$-$310n$.

At block 410, a microprocessor 320 electrically connects the power output of a first battery group (e.g., $302a$) and a second battery group (e.g., $302b$) to the UPS 304. At block 415, the microprocessor 320 monitors the output voltage of the first battery group $302a$ and the second battery group $302b$. At block 420, when the monitored output voltage of the first battery group 302a and the second battery group 302b falls below a predetermined level, the microprocessor 320 electrically disconnects from the UPS 304 the first battery group 302a and electrically connects to the UPS 304 the power output of the third (i.e., another) battery group (e.g., 302n). The first battery group 302a is configured to be re-connectable to the UPS 304 after a time period equal to or greater than necessary to permit the output voltage of the first battery group 302a to recover to about its nominal voltage rating (e.g., 480 vdc).

In an embodiment, the another battery group may be the one that first recovers to its nominal voltage rating or has spent a longest amount of time in a recovered state with respect to nominal voltage rating. In an embodiment, the another battery group may be the one that first recovers to ambient temperature or has spent a longest amount of time in a recovered state with respect to ambient temperature. In an embodiment, the another battery group may be the one that first recovers to it nominal pH rating or has spent a longest amount of time in a recovered state with respect to nominal pH rating.

In another embodiment, the another of the plurality of battery groups may be randomly or sequentially selected from the remaining plurality of battery groups 302b-302n.

In an example of sequential ordering of the plurality of battery groups 302a-302n, as voltage drops across two battery groups (e.g., 302a, 302b) in use (the drop may now be much quicker than if all battery groups 302a-302n were connected to the UPS bus bar 314 simultaneously), a third battery group (e.g., 302n) may be switched into operation while the first (e.g., 302a) is switched out of operation to recover in a resting state while its electrolyte equalizes. When the second battery group 302b and the third battery group 302n exhibit a predetermined voltage drop, the first battery group (e.g., 302a) may be switched into operation while the second battery group 302b is disconnected and recovers. When the third battery group 302n and the first battery group 302a exhibit a predetermined voltage drop, the second battery group (e.g., 302b) may be switched into operation while the third battery group 302n is disconnected and recovers. This sequence repeats ad infinitum. As a result, each battery group avoids operating according to the Peukert equation degradation curve.

From the Puekert equation, a 30% to 40% increase of power capacity or more may be available due as a result of the cycling between loaded and resting battery groups 302a-302n operating at a lower discharge rate. In practice, degradation may be lower to increase overall energy output. A parallel-based string system may still cause inverter input voltage fluctuations (e.g., from 564 vdc to 396 vdc) as string voltage degrades and sources sequence in and out. This is not a significant problem since conventional battery backup systems encounter the same effects.

FIG. 5 is an electrical block diagram of a battery backup power system 500 employing battery cabinets of battery groups or battery strings 502a-502n connected to variable voltage regulators/controllers 506a-506n coupled in series to an uninterruptible power supply (UPS) 504, according to an embodiment of the present invention. In the embodiment depicted in FIG. 5, one or more battery strings may be wired in parallel and configured as multiple (e.g., three) battery groups 502a-502n. Each of the battery groups 502a-502n may be comprised of any type of batteries or battery-like devices that operate though electrochemical means (e.g., lead-acid, lead-air, lithium-ion, a fuel cell, etc.). The one or more battery groups 502a-502n (e.g., three) may be provided with individual variable voltage controllers 506a-506n (e.g., D, E, . . . , N) so that a series summation output voltages of the variable voltage regulators/controllers 506a-506n is maintained at a total predetermined rated output voltage (e.g., 480 volts) coupled to the UPS 504, through the operation of intervening output signal lines 508a-508n (x, y, . . . , z) under the control of a microprocessor 520. The microprocessor 520 may be further configured to monitor output voltage via voltage sensors 510a-510n, 518, respectively in signal communication with the battery groups 502a-502n and the bus bar 514 (i.e. an output 522 of the series connection of the plurality of variable voltage regulators/controllers 506a-506n), respectively, and monitor battery temperatures via temperature sensors 512a-512n in thermal communication with the battery groups 502a-502n. The microprocessor 520 may be further configured to monitor battery pH via pH sensors 513a-513n in signal communication with the battery groups 502a-502n. The UPS bus bar 514 may be equipped with blocking diodes 516a, 516b to permit recharging of the battery groups 502a-502n.

Figure 6:
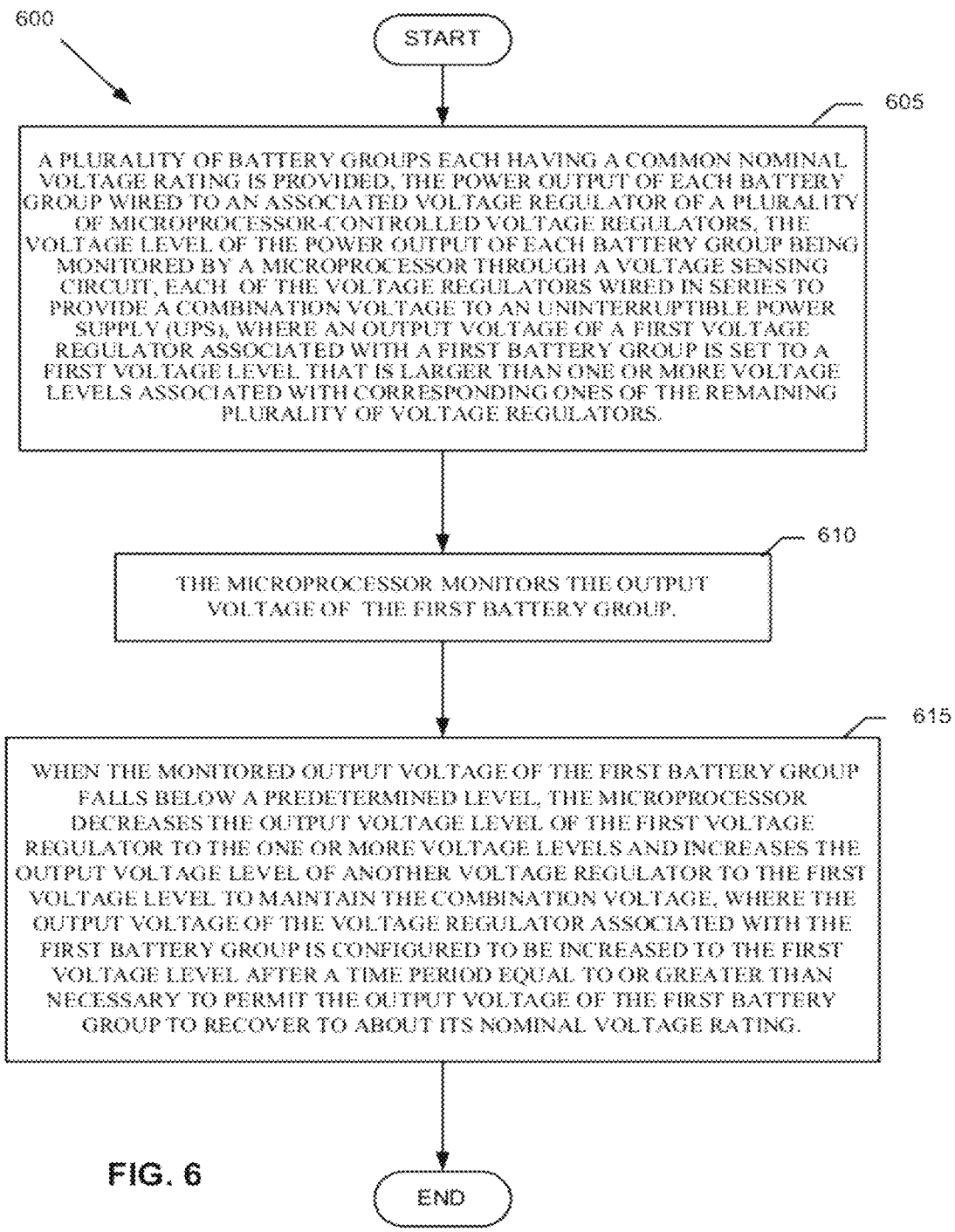
FIG. 6 is a flow diagram illustrating one embodiment of a method for increasing workable power output of the battery backup system of FIG. 5.

FIG. 6 is a flow diagram illustrating one embodiment of a method 600 for increasing workable power output of the battery backup system 500 of FIG. 5. At block 605, a plurality of battery groups (e.g., 502a-502n) each having a common nominal voltage rating (e.g., 480 vdc) is provided. The power output of each battery group 502a-502n is wired for electrical connection to an associated voltage regulator of a plurality of microprocessor-controlled voltage regulators 506a-506n. The voltage level of the power output of each battery group 502a-502n is monitored by the microprocessor 520 through an associated voltage sensing circuit 510a-510n. Each of the voltage regulators 506a-506n is wired for electrical connection in series to provide a combination voltage to the UPS 504. An output voltage of a first voltage regulator (e.g., 506a) associated with a first battery group (e.g., 502a) is set by microprocessor control to a first voltage level (e.g., 400 vdc) that is larger than one or more voltage levels (e.g., 40 vdc) set by microprocessor control and associated with corresponding ones of the remaining voltage regulators 506b-506n. At block 610, the microprocessor 520 monitors the output voltage of the first battery group 502a. At block 615, when the monitored output voltage of the first battery group 502a falls below a predetermined level, the microprocessor 520 decreases output voltage level of the first voltage regulator 506a to the one or more voltage levels (e.g., 40 vdc) and increases the output voltage level of another of the plurality of voltage regulators to the first voltage level to maintain the combination voltage. The output voltage of the voltage regulator 506a associated with the first battery group 502a may be configured to be increased to the first voltage level after a time period equal to or greater than necessary to permit the output voltage of the first battery group 502a to recover to about its nominal voltage rating (e.g., 480 vdc).

In an embodiment, the another battery group may be the one that first recovers to its nominal voltage rating or has spent a longest amount of time in a recovered state with respect to nominal voltage rating. In an embodiment, the another battery group may be the one that first recovers to ambient temperature or has spent a longest amount of time in a recovered state with respect to ambient temperature. In an embodiment, the another battery group may be the one that first recovers to it nominal pH rating or has spent a longest amount of time in a recovered state with respect to nominal pH rating.

In another embodiment, the another of the plurality of battery groups may be randomly or sequentially selected from the remaining plurality of battery groups 502b-502n.

In one embodiment, the predetermined voltage may be a rated voltage of a low-voltage circuit breaker (e.g., 524a) coupled to an output of the first battery group (e.g., 502a). In one embodiment, the rated voltage of the low-voltage circuit breaker 524a may exceed a minimum voltage necessary to produce an output voltage from the UPS 504.

In one embodiment, the rate of decreasing the output voltage of the first variable voltage regulator 506a is about the rate of increasing the output voltage of a second variable voltage regulator (e.g., 506b) such that the combination voltage remains substantially constant.

In an example, the series configuration of variable voltage regulators 506a-506n coupled between the battery groups 502a-502n and the UPS 504 of FIG. 5 may be more advantageous than a parallel configuration of battery groups 302a-302n individual coupled by power switches 306a-306n to the UPS 304 of FIG. 3, since the UPS/inverter 504 would see a nearly constant total predetermined input voltage (e.g., 480 volts). Efficiency improves since the microprocessor 520 may not need to compensate for input voltage variations as the battery groups 402a-402n lose power and their respective output voltages drop. This configuration is maintained until the output voltage of the first battery group 502a falls below a predetermined threshold voltage. The output voltage of the first variable voltage regulator 506a is almost immediately reduced to a predetermined low voltage (e.g., 40 vdc) so that its corresponding battery group 502a may recover to about its rated voltage (e.g., 480 vdc). The output voltage of the second variable voltage regulator 506b is ramped up to the original nominal output voltage of the first variable voltage regulator 506a (e.g., 400 vdc). The ramping rates of each of the first and second variable voltage regulator 506a, 506b may be programmed to offset each other to maintain the desired predetermined output voltage (e.g., 480 vdc). Later, the third variable voltage regulator 506n may be ramped to a higher voltage when the second battery group 502b is drained and then its corresponding variable voltage regulator 506b is ramped to a lower predetermined output voltage (e.g., 40 vdc). This sequence may repeat itself by switching between the third battery group 502n/variable voltage regulator 506n back to the first battery group 502a/variable voltage regulator 506n ad infinitum.

The recovery voltage may be set higher in a series configuration compared to a parallel configuration since each power source enters a semi-rest mode rather than a full rest mode, respectively. In one embodiment, one variable voltage regulator (e.g., 506a) may be maintained at a relatively large nominal output voltage compared to the other variable voltage regulators (e.g., 506b, 506n). An advantage of a series configuration is that a constant 480 vdc input may be provided to the UPS/inverter 604. A disadvantage (or possibly an advantage as some current production may speed electrolyte movement) of the series configuration may be that no one battery group ever fully rests since no one battery group is completely disconnected from the UPS 504 or power load (as in the parallel configuration). Conversely, recovery may be quicker.

The present invention is subject to variations. The system 300, 500 may employ self-learning, i.e., when voltage and current consumption are measured over time, a rate of decline per individual power source may be deduced. This information may be employed to load individual power sources to equalize wear or total energy capacity over time.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method, comprising:

providing a plurality of battery groups each having a nominal voltage rating, the power output of each battery group wired for electrical connection to an uninterruptible power supply (UPS) through a microprocessor-controlled power switch, and the voltage level of the power output of each battery group being monitored by the microprocessor through a voltage sensing circuit;

electrically connecting the power output of a first battery group and a second battery group to the UPS by use of microprocessor control;

monitoring, by the microprocessor, the output voltage of the first battery group and the second battery group; and when the monitored output voltage of the first battery group falls below a predetermined level, electrically disconnecting from the UPS by microprocessor control the first battery group and electrically connecting to the UPS by microprocessor control the power output of another of the plurality of battery groups in view of the monitored output voltage of the first battery group approaching a value corresponding to Peukert's Number n, wherein $C=I^nT$ is Peukert's Equation, wherein C is the theoretical capacity of a battery expressed in amp-hours, I is the current, and T is time, and reconnecting the first battery group to the UPS by microprocessor control after a time period equal to or greater than necessary to permit the output voltage of the first battery group to recover to about its nominal voltage rating in view of the monitored output voltage of the first battery group approaching a value corresponding to Peukert's Number n.

2. The method of claim 1, wherein the another of the plurality of battery groups is a battery group that first recovers to its nominal voltage rating.

3. The method of claim 1, wherein the another of the plurality of battery groups is a battery group that has spent a longest amount of time in a recovered state with respect to nominal voltage rating.

4. The method of claim 1, wherein the another of the plurality of battery groups is a battery group that first recovers to ambient temperature.

5. The method of claim 1, wherein the another of the plurality of battery groups is a battery group that has spent a longest amount of time in a recovered state with respect to ambient temperature.

6. The method of claim 1, wherein the another of the plurality of battery groups is a battery group that first recovers to it nominal pH rating.

7. The method of claim 1, wherein the another of the plurality of battery groups is a battery group that has spent a longest amount of time in a recovered state with respect to nominal pH rating.

8. The method of claim 1, wherein the another of the plurality of battery groups is randomly selected from the remaining plurality of battery groups.

9. The method of claim 1, wherein the another of the plurality of battery groups is sequentially selected from the remaining plurality of battery groups.

10. A method, comprising:
providing a plurality of battery groups each having a common nominal voltage rating, the power output of each battery group wired for electrical connection to an associated voltage regulator of a plurality of microprocessor-controlled voltage regulators, the voltage level of the power output of each battery group being monitored by a microprocessor through a voltage sensing circuit, each of the voltage regulators wired for electrical connection in series to provide a combination voltage to an uninterruptible power supply (UPS), wherein an output voltage of a first voltage regulator associated with a first battery group is set by microprocessor control to a first voltage level that is larger than one or more voltage levels set by microprocessor control and associated with corresponding ones of the remaining plurality of voltage regulators;
monitoring, by the microprocessor, the output voltage of the first battery group; and
when the monitored output voltage of the first battery group falls below a predetermined level,
decreasing by microprocessor control the output voltage level of the first voltage regulator to the one or more voltage levels and increasing by microprocessor control the output voltage level of another of the plurality of voltage regulators to the first voltage level to maintain the combination voltage,
wherein the output voltage of the voltage regulator associated with the first battery group is to be increased to the first voltage level by microprocessor control after a time period equal to or greater than necessary to permit the output voltage of the first battery group to recover to about its nominal voltage rating.

11. The method of claim 10, wherein the another of the plurality of voltage regulators is associated with a battery group that first recovers to its nominal voltage rating.

12. The method of claim 10, wherein the another of the plurality of voltage regulators is associated with a battery group that has spent a longest amount of time in a recovered state with respect to nominal voltage rating.

13. The method of claim 10, wherein the another of the plurality of voltage regulators is associated with a battery group that first recovers to ambient temperature.

14. The method of claim 10, wherein the another of the plurality of voltage regulators is associated with a battery group that has spent a longest amount of time in a recovered state with respect to ambient temperature.

15. The method of claim 10, wherein the another of the plurality of voltage regulators is associated with a battery group that first recovers to it nominal pH rating.

16. The method of claim 10, wherein the another of the plurality of voltage regulators is associated with a battery group that has spent a longest amount of time in a recovered state with respect to nominal pH rating.

17. The method of claim 10, wherein the another of the plurality of voltage regulators is randomly selected from the remaining plurality of voltage regulators.

18. The method of claim 10, wherein the another of the plurality of voltage regulators is sequentially selected from the remaining plurality of voltage regulators.

19. The method of claim 10, wherein a rate of decreasing the output voltage of the first voltage regulator is about the rate of increasing the output voltage of the another of the plurality of voltage regulators such that the combination voltage remains substantially constant.

20. A battery backup system, comprising a plurality of battery groups each having a nominal voltage rating, the power output of each battery group wired for electrical connection to an uninterruptible power supply (UPS) through a microprocessor-controlled power switch, and the voltage level of the power output of each battery group being monitored by a microprocessor through a corresponding voltage sensing circuit, the microprocessor to:
electrically connect the power output of a first battery group to the UPS;
monitor the output voltage of the first battery group; and
when the monitored output voltage of the first battery group falls below a predetermined level,
electrically disconnect from the UPS by microprocessor control the first battery group and electrically connect to the UPS by microprocessor control the power output of another of the plurality of battery groups in view of the monitored output voltage of the first battery group approaching a value corresponding to Peukert's Number n, wherein $C=I^nT$ is Peukert's Equation, wherein C is the theoretical capacity of a battery expressed in amp-hours, I is the current, and T is time, and
reconnect the first battery group to the UPS after a time period equal to or greater than necessary to permit the output voltage of the first battery group to recover to about its nominal voltage rating in view of the monitored output voltage of the first battery group approaching a value corresponding to Peukert's Number n.

21. A battery backup system, comprising:
a plurality of battery groups each having a common nominal voltage rating, the power output of each battery group wired for electrical connection to an associated voltage regulator of a plurality of microprocessor-controlled voltage regulators, the voltage level of the power output of each battery group being monitored by a microprocessor through a corresponding voltage sensing circuit, each of the voltage regulators wired for electrical connection in series to provide a combination voltage to an uninterruptible power supply (UPS), wherein an output voltage of a first voltage regulator associated with a first battery group is set by microprocessor control to a first voltage level that is larger than one or more voltage levels set by microprocessor control and associated with corresponding ones of the remaining plurality of voltage regulators, the microprocessor to:
monitor the output voltage of the first battery group; and
when the monitored output voltage of the first battery group falls below a predetermined level,
decrease the output voltage level of the first voltage regulator to the one or more voltage levels and increase the output voltage level of another of the plurality of voltage regulators to the first voltage level to maintain the combination voltage,
wherein the output voltage of the voltage regulator associated with the first battery group is to be increased to the first voltage level after a time period equal to or greater than necessary to permit the output voltage of the first battery group to recover to about its nominal voltage rating.

22. The system of claim 21, wherein each of the plurality of voltage regulators is a variable voltage regulator.

* * * * *